Sept. 3, 1963 L. T. ANDERSON ET AL 3,102,930

AUTOMATIC TELEPHONE SWITCHING SYSTEM

Filed March 13, 1959 8 Sheets-Sheet 1

INVENTORS L. T. ANDERSON
E. G. CRANE, JR.
BY S. E. Hollander
ATTORNEY

INVENTORS L. T. ANDERSON
E. G. CRANE, JR.
BY S. E. Hollander
ATTORNEY

Sept. 3, 1963 L. T. ANDERSON ET AL 3,102,930

AUTOMATIC TELEPHONE SWITCHING SYSTEM

Filed March 13, 1959 8 Sheets-Sheet 3

INVENTORS L. T. ANDERSON
E. G. CRANE, JR.
BY S. E. Hollander
ATTORNEY

INVENTORS L. T. ANDERSON
E. G. CRANE, JR.
BY S. E. Hollander
ATTORNEY

INVENTORS L. T. ANDERSON
E. G. CRANE, JR.
BY S. E. Hollander
ATTORNEY

INVENTORS L.T. ANDERSON
E.G. CRANE, JR.
BY S.E. Hollander
ATTORNEY

INVENTORS L. T. ANDERSON
E. G. CRANE, JR.
BY S. E. Hollander
ATTORNEY

Sept. 3, 1963 L. T. ANDERSON ET AL 3,102,930

AUTOMATIC TELEPHONE SWITCHING SYSTEM

Filed March 13, 1959 8 Sheets-Sheet 8

INVENTORS L. T. ANDERSON
E. G. CRANE, JR.
BY S. E. Hollander
ATTORNEY

United States Patent Office 3,102,930

Patented Sept. 3, 1963

3,102,930

AUTOMATIC TELEPHONE SWITCHING SYSTEM

Lynn T. Anderson, Metuchen, and Ernest G. Crane, Jr., Summit, N.J., assignors to Bell Telephone Laboratories, Incorporated, New York, N.Y., a corporation of New York

Filed Mar. 13, 1959, Ser. No. 799,260

14 Claims. (Cl. 179—26)

This invention relates to telephone switching systems and more particularly to a telephone central office in which private branch exchange subscribers and community subscribers share common facilities. "Community" subscribers in this context encompasses various types of subscribers other than private branch exchange subscribers including flat rate, private and party lines, coin lines, etc.

In the past it has been customary to supply private branch exchanges as integral units to customers who required such service. The private branch exchange, or PBX, would generally be installed at the location of the customer's premises.

The extensions or stations served by the PBX are usually terminated at the PBX switchboard or switching facilities. From the private branch exchange a group of trunks considerably smaller in number than the number of disadvantages inhere in the use of conventional private Although completely operative and useful, as evidenced by the widespread acceptance of PBX service, a number of disadvantages inherein the use of conventional private branch exchange arrangements.

Thus, in order for a subscriber outside of a PBX to call an extension within the PBX, it is generally necessary to dial the directory number of the private branch exchange and thereafter be connected manually to the desired extension. As an alternative measure, in-dialing facilities have been made available to a limited extent but these are attended by a considerable magnification in complexity of the switching arrangements.

An additional discommodious feature in using PBX facilities stems from a number of technical obstacles that have heretofore slowed the development of certain aspects of PBX facilities behind the rapid advance of general switching technology. This situation is seen most dramatically in area where direct distance dialing is available, i.e., where a subscriber may dial a nationwide long distance call without operator intervention. One of the barriers which prevents the application of direct distance dialing to private branch exchange extensions is rooted in the problem of individually billing the extension for the appropriate toll charges. Since each extension is terminated at the private branch exchange and must share common trunking facilities to reach the telephone central office, automatic identification of the extensions at the central office has been an onerous and generally insurmountable obstacle.

The usual, and from the standpoint of efficiency and economy, unsatisfactory, recourse is to burden the operators at private branch exchanges with the duty of identifying and manually attributing toll charges for long distance calls to the individual extensions from which the calls have been placed.

It is therefore an object of this invention to automatically attribute toll or revenue charges for long distance and other calls directly to the PBX extension concerned.

It is a further object of this invention to enable automatic identification of each PBX extension from the central office.

In consequence of the universally increasing use of PBX's, a continually growing number of calls are being effected between one extension of a PBX and another extension of a different PBX, i.e., inter-PBX calls. In completing such a call, it is necessary for the party originating the call to establish access to an outgoing trunk to a central office before he can dial the directory number of the called PBX. Numerous automatic and semiautomatic facilities are available for enabling the calling party to seize a trunk to the central office.

When the central office receives information relating to the called directory number, it establishes a connection over a trunk to the called PBX. Unless the highly specialized features of automatic in-dialing are available, the calling party will first reach the PBX operator at the called PBX. Thereafter the calling party must relay to the operator the extension sought to be reached. Finally, through semiautomatic or manual operation, the operator connects the incoming call to the desired PBX extension.

Thus a somewhat tortuous channel is established with constructions in the flow of traffic at both PBX switchboards.

It is therefore another object of this invention to permit automatic interconnection between extensions of different PBX's by dialing the called PBX extension directly and without operator intervention.

Perhaps the most significant inefficiency inhering in the use of large PBX facilities is the fact that, in effect, it provides a duplication of a large part of the attached central office facilities. A 5000-line PBX, for example, is an installation comparable in magnitude and complexity to a moderate sized telephone central office. It would appear manifestly inefficient to throttle the outgoing traffic flow from such a large telephone installation by extending a limited number of lines to a conventional telephone central office, over which lines individual subscribers at the PBX extensions are forced to route their outside calls. This, however, has been a necessary practice in the past.

The situation is rendered particularly acute in an environment in which a relatively large PBX services an industry or other establishment located in a moderate sized or relatively small community. Here the duplication and ineffectiveness are shown in sharpest relief. A complete, independent, switching installation must be provided for the private branch exchange. In addition, separate and virtually identical switching facilities must be provided for the individual subscribers in the community. In order for subscribers in the community to call PBX extensions and vice versa, it is necessary to proceed tortuously through paths including the limited number of lines between the PBX and the central office adverted to above.

This difficulty is further compounded by the fact that the PBX may be located in a community which is too small to bear the expense attending the installation of a modern automatic switching system. Often a complex and extensive PBX installation having the most comprehensive facilities may be required to service a very large industrial entity in a location proximate to a small suburban or semirural community. In consequence, intra-PBX service facilities may be of the highest quality but in order for a private branch exchange subscriber who originates his call from a PBX extension to communicate with subscribers outside the PBX it is necessary to effect a connection through the relatively limited and perhaps dated facilities of the community central office.

To some extent this forces an involuntary degradation of the quality of service available to the PBX subscribers. By compelling the PBX subscribers to route their outside connections through the comparatively modest facilities available in the central office, the PBX subscribers are, in effect, limited to the same quality of service available to the residents of the town.

It is therefore an object of this invention to provide for the connection of PBX subscribers to points in the telephone network outside of the PBX without passing through a community telephone central office.

It is another object of this invention to provide for automatic connection to a PBX extension by a subscriber calling from outside the PBX without recourse to operator aid.

It is a further object of this invention to permit automatic in-dialing to a PBX extension.

It is still another object of this invention to permit subscribers at PBX extensions to fully utilize direct distance dialing facilities available to community subscribers in the same telephone area.

A further object of this invention is to terminate PBX extensions and community subscriber lines at telephone switches in a commonly shared central office.

It is another object of this invention to permit PBX extensions in a large PBX installation and community lines in a community located adjacent to the PBX to share common central office facilities.

Still another object of this invention is to provide a combined PBX and telephone central office wherein the switching facilities provide PBX service for PBX subscribers and regular telephone service for community subscribers.

It is a further object of this invention to permit economies in the installation and operation of a telephone plant by adapting the telephone equipment to perform dual service functions.

These and other objects of the invention are realized in a telephone switching central office, for example a No. 5 crossbar office of the type described in Patent No. 2,585,904 of A. J. Busch on February 19, 1952, wherein the equipment is modified to provide PBX facilities for PBX subscribers and conventional telephone facilities for other subscribers.

As part of this arrangement telephone subscribers in the community have lines which are terminated in the usual manner on verticals of crossbar switches. Each private community telephone customer has an individual termination at the telephone central office whereas party line subscribers are supplied with common terminating facilities in a well-known manner.

However a significant departure from routine practice is focused in the disposition of the PBX arrangement. In lieu of the usual PBX facilities which are physically located on or proximate to the PBX subscribers' premises, all of the PBX facilities are concentrated in the same telephone central office to which the private line subscribers are connected. A separate line is carried from each PBX extension to a combined PBX and central office where a termination is individually made for each PBX extension on a vertical of a crossbar switch in a manner analogous to that utilized for termination of private line subscribers. Thus PBX extensions and private lines are both terminated in the same telephone central office.

The private lines in the community may dial conventionally to effect telephone connections and will be serviced by the telephone central office in a manner similar to that of other telephone central offices. For example, a private line subscriber seeking to effect a connection to another subscriber may dial a seven-digit code in which the first three digits are the office code and the last four identify the subscriber's directory number. If the telephone central office includes facilities for direct distance dialing, i.e., long distance dialing without operator assistance, a ten-digit code may advantageously be utilized. In this instance the first three digits comprise a nationwide area or regional code and the last seven indicate the telephone exchange and subscriber directory number.

In the case of the PBX extensions, however, the telephone central office provides a totally different service facility. Insofar as the PBX extensions are concerned the telephone central office is a complete and integrated PBX. For example, in dialing another PBX extension from a given PBX extension, the calling party need only dial the digits of the called extension without incorporating any telephone office code. The combined central office PBX recognizes the call as an intra-PBX call and effects a connection to the called PBX extension through the shared facilities of the central office. Thus in a PBX arrangement which includes less than 7000 lines only four digits need be dialed to reach any PBX extension from another PBX extension.

The flexibility that inheres in the instant invention is demonstrated by the fact that PBX extensions which seek to effect connections to calls outside the PBX are handled by the telephone central office in a manner which resembles the treatment for private line subscribers. Thus the quality of service to an individual PBX extension is enhanced. Since each PBX extension is individually terminated at the combined PBX and central office, automatic identification of the PBX extension may be effected in a manner similar to that for the other private or community lines connected to the central office. In this manner the chief obstacle to direct distance dialing by PBX extensions is overcome.

In an illustrative embodiment of the invention a PBX subscriber seeking to make an intra-PBX call need only dial four digits. To make calls outside the PBX an initial directing code consisting of a single digit is dialed. Thereafter the PBX subscriber at an extension will dial a seven or ten-digit number consisting of an office code and directory number or area code plus office code and directory number in a manner similar to that of the community subscribers.

For calls to the PBX from outside lines where the calling party is not aware of the proper extension number, a conventional PBX switchboard is employed. An operator situated at the switchboard renders assistance in such incoming call situations. It is evident from the configuration of the combined PBX and telephone central office that no trunking facilities are required between the PBX and telephone central office as in conventional arrangements since each extension is, in effect, individually terminated at the central office.

A feature of this invention includes separate originating register facilities for PBX extensions and community lines.

Still another feature of this invention includes preregister apparatus in said second type of register adapted to store an initial directing code.

Still another feature of this invention comprises arrangements in said preregister for inhibiting the registration of predetermined digits.

Another feature includes equipment in said second register for registering digits of a lower order than said predetermined digits.

Still another feature comprises arrangements in said second register for registering digits of a higher order than said predetermined digits.

A further feature includes equipment in said second register responsive to the reception of a predetermined number of digits and the expiration of a predetermined period of time for disenabling said register.

Still another feature of this invention includes facilities for dialing long distance or toll calls by said PBX extensions after registration of a directing code.

A further feature of this invention includes apparatus for automatically identifying and billing PBX extensions on toll calls.

Still another feature of this invention includes equipment for recognizing intra-PBX calls and completing said calls on the reception of a lesser number of digits than required to interconnect community lines.

Still another feature includes apparatus for direct in-dialing to PBX extensions from community lines and from remote central offices.

It is apparent from the arrangements incorporated in the present invention that the disadvantage of duplication inherent in preexisting arrangements wherein a large and costly PBX facility is located proximate to a small community is surmounted. Thus in a PBX facility which includes illustratively 6000 extensions located near a community of, for example, 1500 lines, a combined telephone central office and PBX apparatus will provide dual service features for both.

The community benefits materially from the enhancement of the quality of service available to it since although a relatively small number of community lines are involved, a modern telephone plant is economically justifiable.

The PBX subscribers benefit directly from the lack of necessity to proceed through common trunking facilities to the telephone central office. In addition, the quality of service to PBX extensions is markedly improved since direct distance dialing is now available to each extension. Thus both the PBX subscriber and the community share mutually in the benefits occasioned by the utilization of the instant invention.

These and other objects and features of the invention may be more readily comprehended from an examination of the following specification and attached drawing, in which:

FIG. 1A is a block diagram of apparatus for extending dialing connections from community and PBX subscribers to the receptive originating registers;

FIG. 1B indicates in block diagram form the equipment included in implementing an intraoffice connection between a PBX subscriber and a community or PBX subscriber in the combined PBX and telephone central office;

Figure 2:
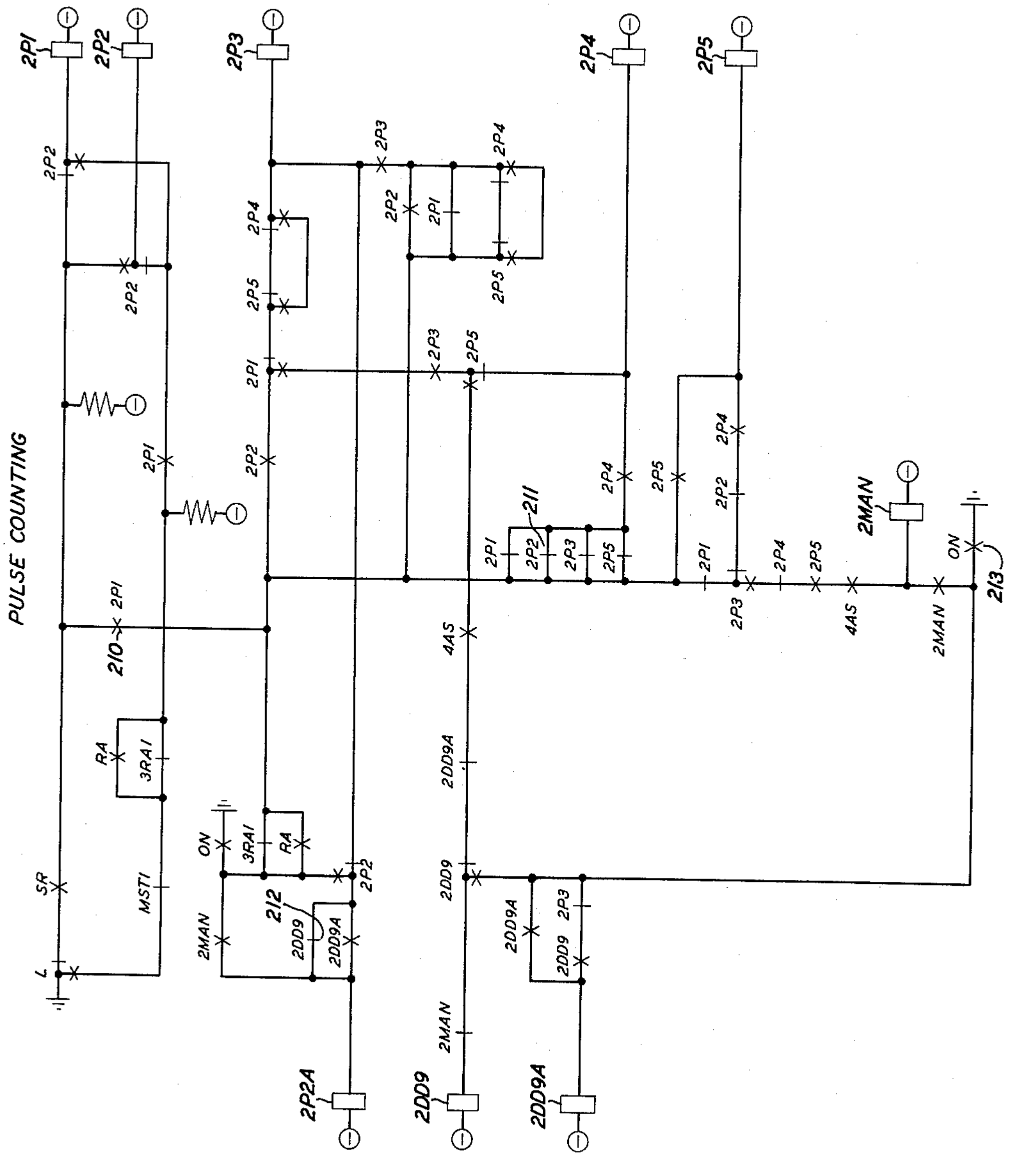
FIGS. 2–4 represent in detached contact form portions of the PBX originating register shown in dotted outline in FIGS. 1A, 1B and 1C.
Figure 3:
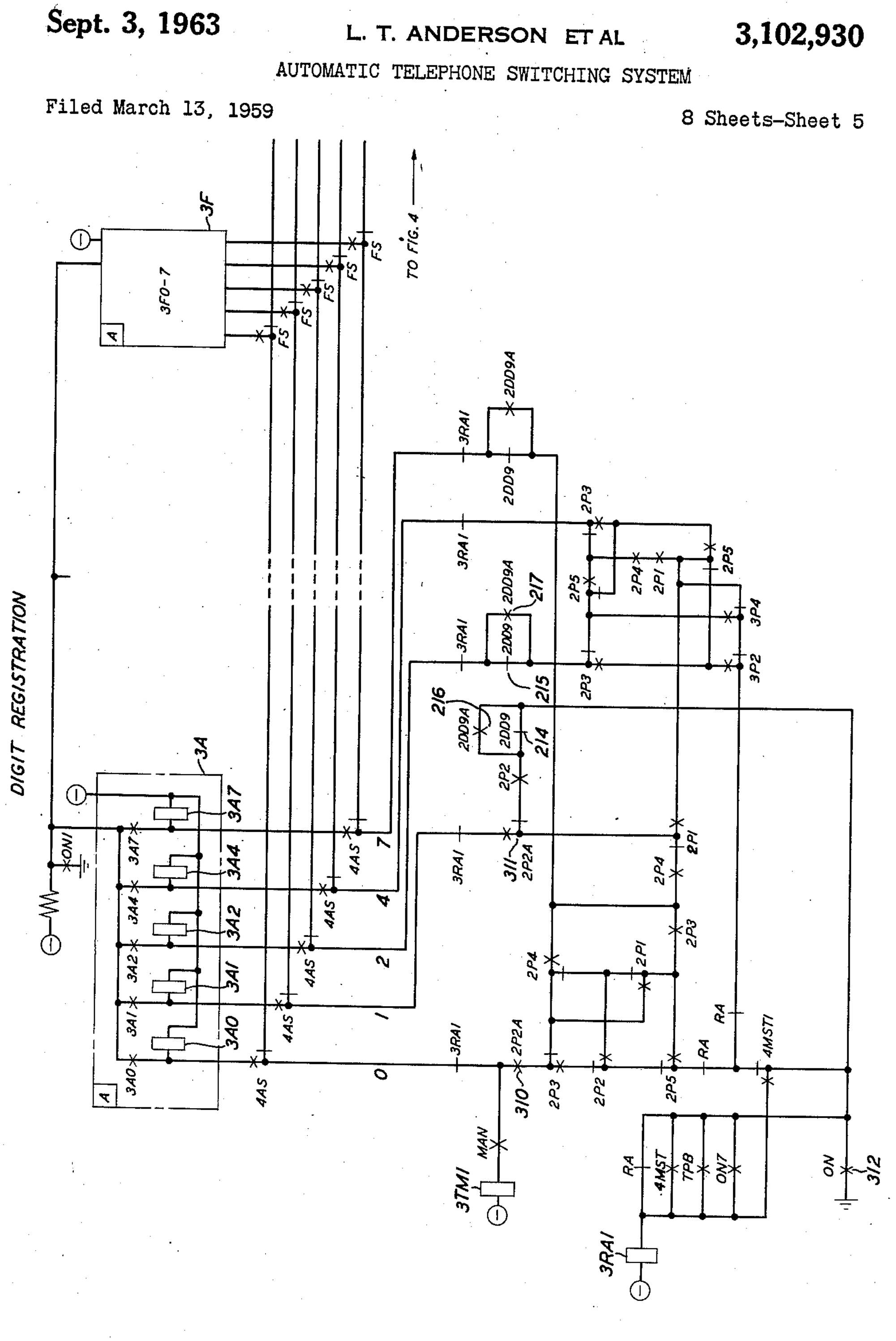
Figure 4:
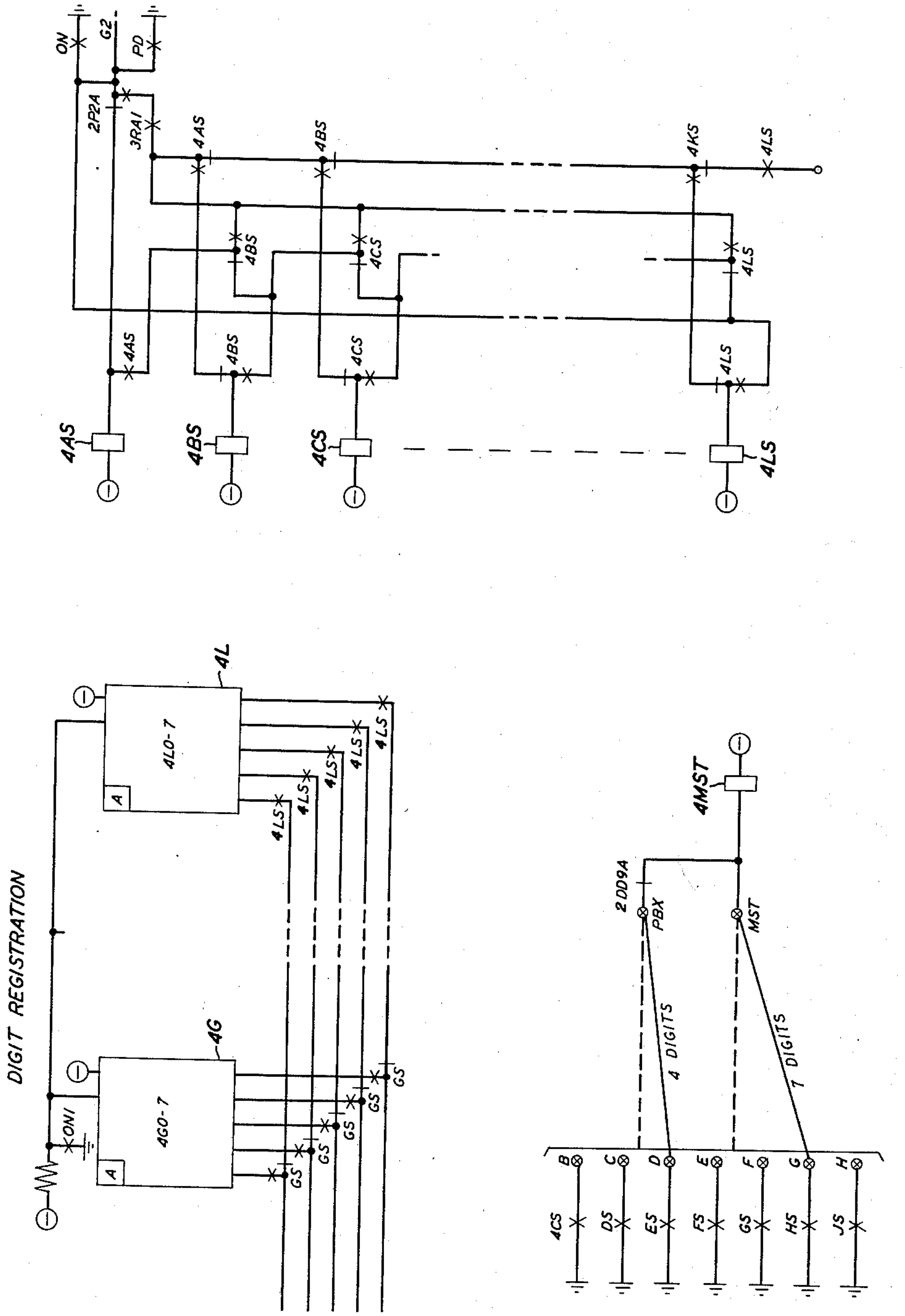
Figure 5:
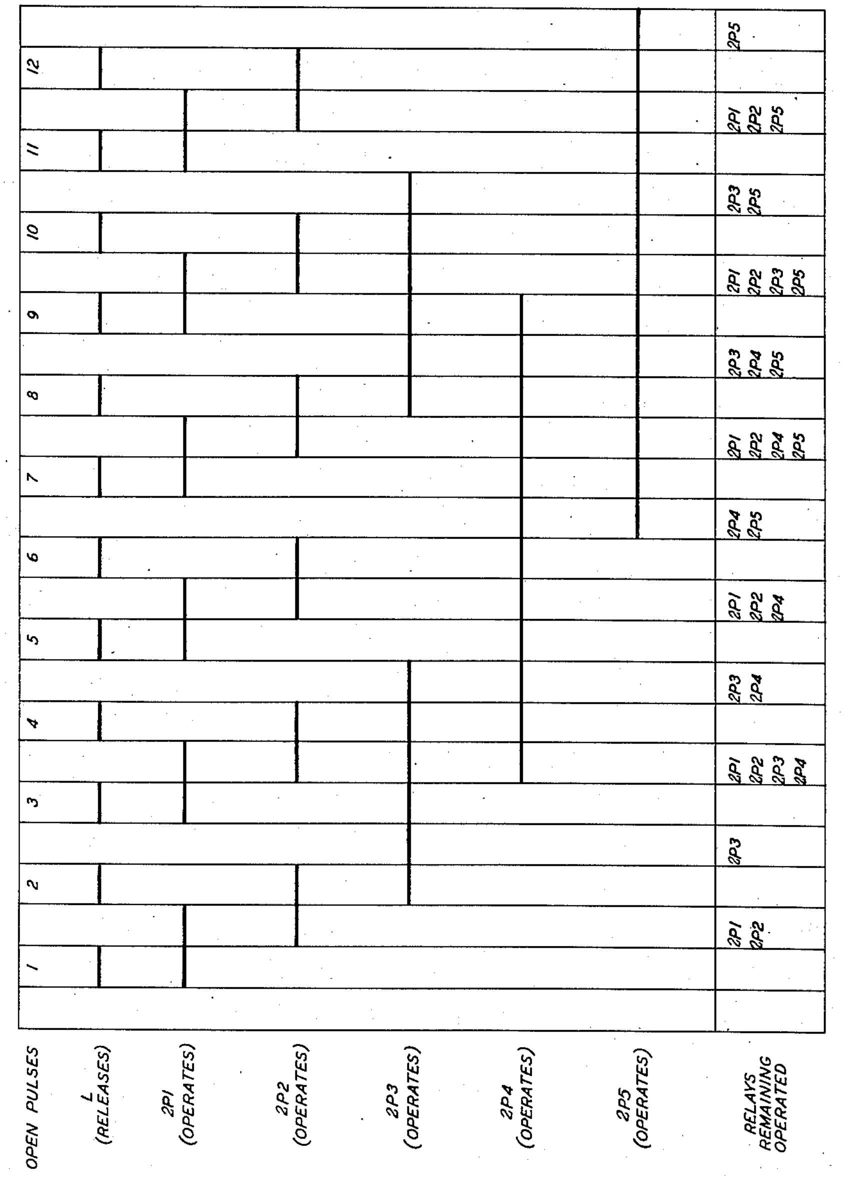
Figure 6:
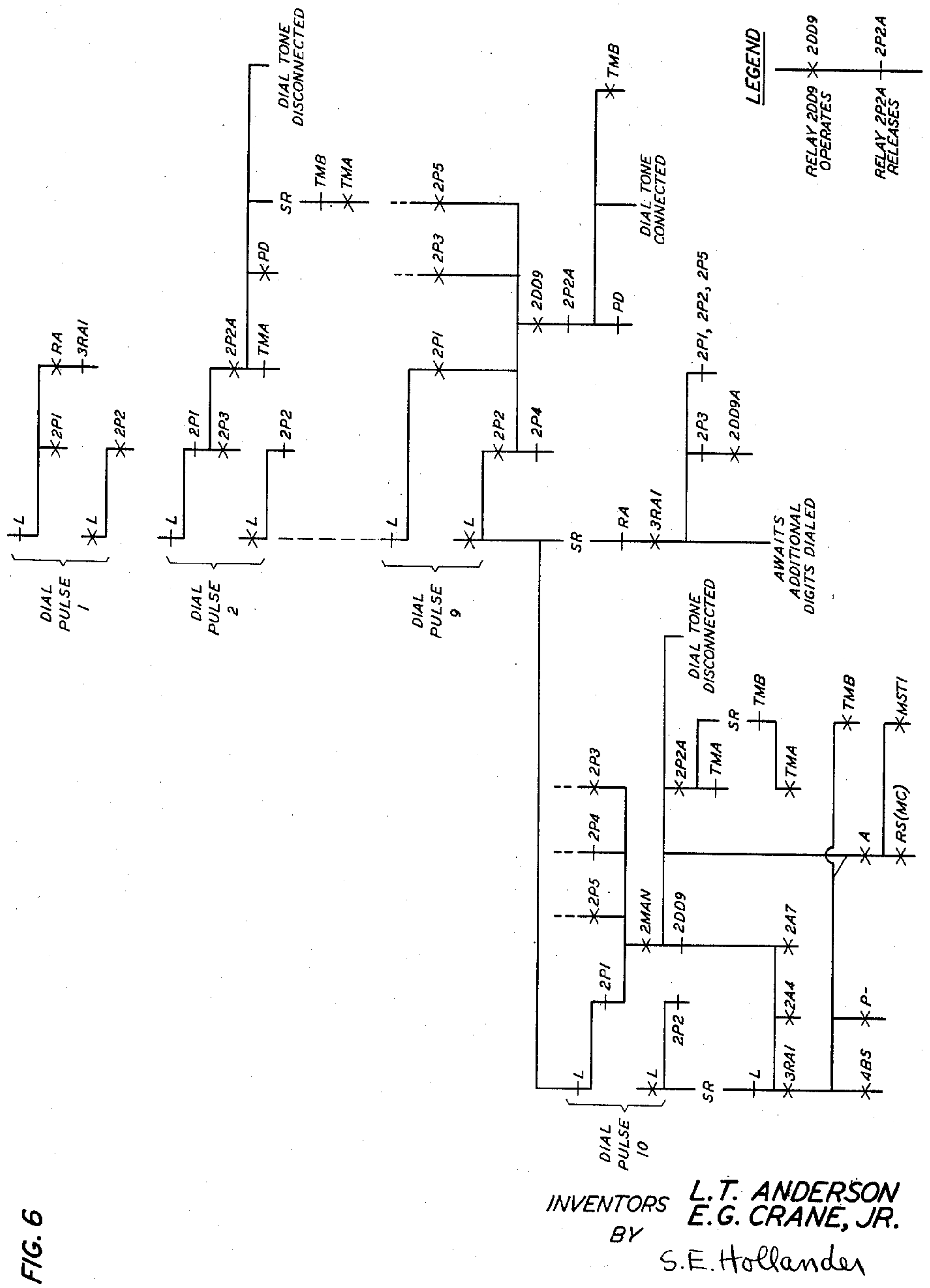

FIG. 5 graphically depicts the functional relationship of the line relay L and the counting relays 2P1–2P5 of FIG. 2; and FIG. 6 is a sequence chart indicating the time sequence of operation of the relays included in FIGS. 2–4.

GENERAL DESCRIPTION

*Dialing Connection*

Figure 1A:
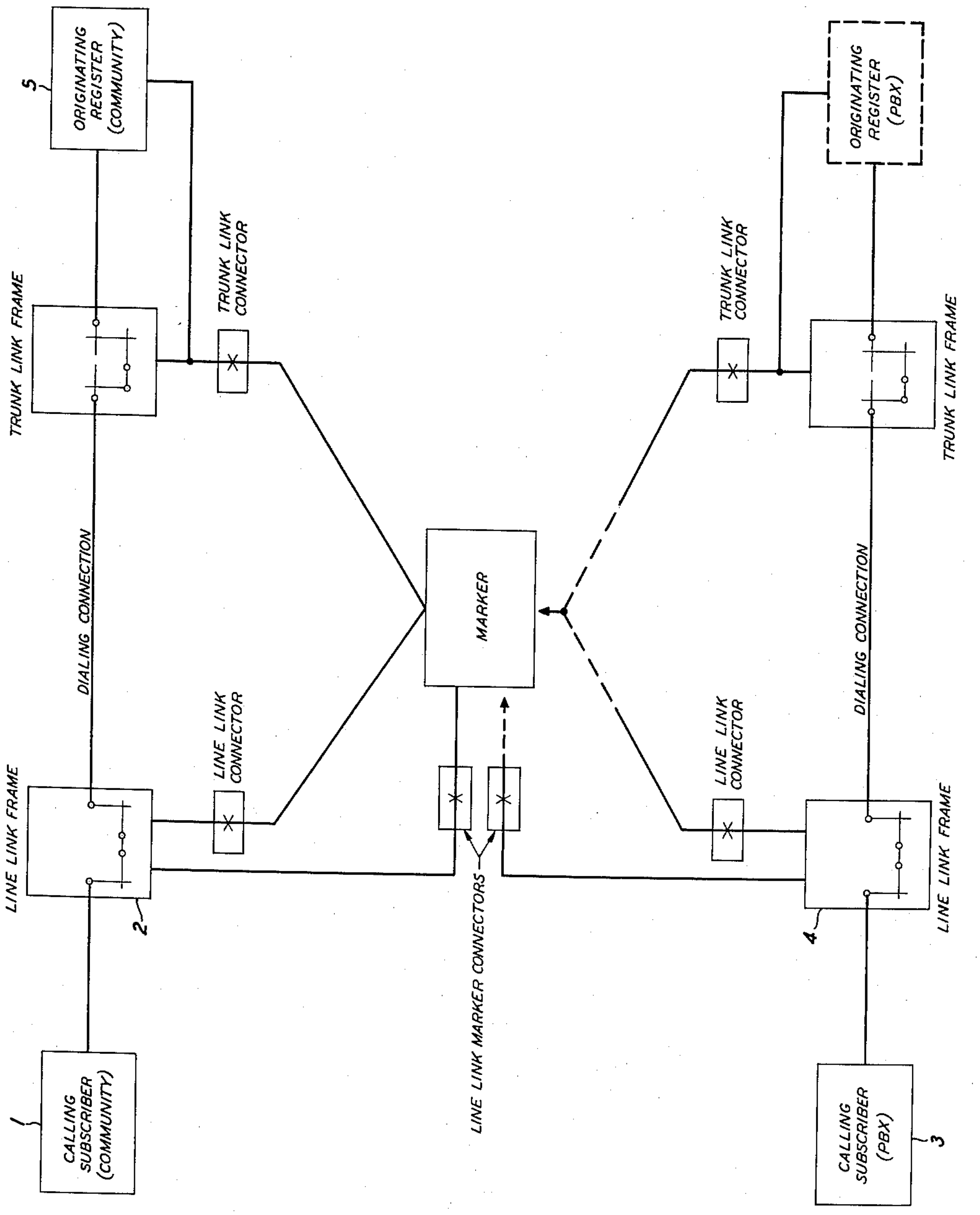
FIG. 1C illustrates in block diagram form apparatus in the combined PBX and telephone central office utilized in completing an outgoing call to a remote PBX or central office which is originated by a calling PBX or community subscriber.

Referring now to FIG. 1A, an illustrative embodiment of the present invention is shown in block diagram form. The apparatus outlined represents a portion of a No. 5 crossbar telephone office of the type disclosed in detail in the above-referred to patent of A. J. Busch. The equipment therein described is modified in accordance with the present invention in several particulars described in detail herein.

In FIG. 1A the equipment shown in solid outline form represents conventional apparatus described in the Busch patent and the PBX originating register shown in dotted outline represents modified apparatus incorporated by the present invention. The detailed modifications required in the originating register shown in dotted outline form in FIG. 1A are disclosed in detail in FIGS. 2–4.

In FIG. 1A a community or private customer 1 is connected to a line link frame 2 in a manner similar to that described in the Busch patent. A PBX subscriber 3 is connected to a line link frame 4 in a similar manner. For purposes of clarity the PBX subscriber is shown connected to an independent line link frame although it is consonant with the practice of the present invention to connect both community subscribers and PBX subscribers to the same line link frame.

When a community subscriber lifts the receiver from the switchhook, a line relay is operated which causes the line link frame to inform the line link marker connector that a marker is required. An idle marker is selected by the line link marker connector and the identity of the calling line is transmitted to the marker. The marker determines the class of service and equipment location of the calling line and establishes if an idle originating register is available and the number of the trunk link frame on which the idle register appears.

By virtue of a class of service mark delivered to the marker, which differentiates between community subscribers and PBX subscribers in a well-known manner similar to the distinction between coin stations, and flat rate stations, etc., the marker invariably selects a community originating register 5 to receive the dialing signals of a community subscriber.

By the same token when a PBX subscriber initiates a call, a similar procedure is undertaken by the marker which always selects on a class of service mark basis a modified or PBX originating register to receive the dial signals from the PBX substation. FIG. 1A manifestly indicates that separate originating registers are employed for the community subscribers and for the PBX subscribers. However, as is well known in the art, the marker performs its services on a time division basis and the marker is connected to only one of the originating registers, line link frames and trunk link frames, etc. at one given instant.

To continue the implementation of the dialing connection the marker then selects an idle channel between the community subscriber 1 and the community originating register 5. Information concerning the identity of the calling line, equipment number, class of service, etc. are stored in the originating register by the marker which now releases.

The community originating register now furnishes dial tone to the community subscriber and is prepared to receive the dialed digits. When dialing is completed the originating register seizes the marker and transmits the registration to it. This information now includes equipment location, class of service of the calling subscriber, number of the line link frame and the called directory number.

If the call in progress is originated by a PBX customer, the marker is connectable to the line link frame 4 and to the PBX originating register as indicated by the dotted arrows to perform functions similar to those described above.

*Intraoffie Call from PBX Customer to Community Subscriber*

Figure 1B:
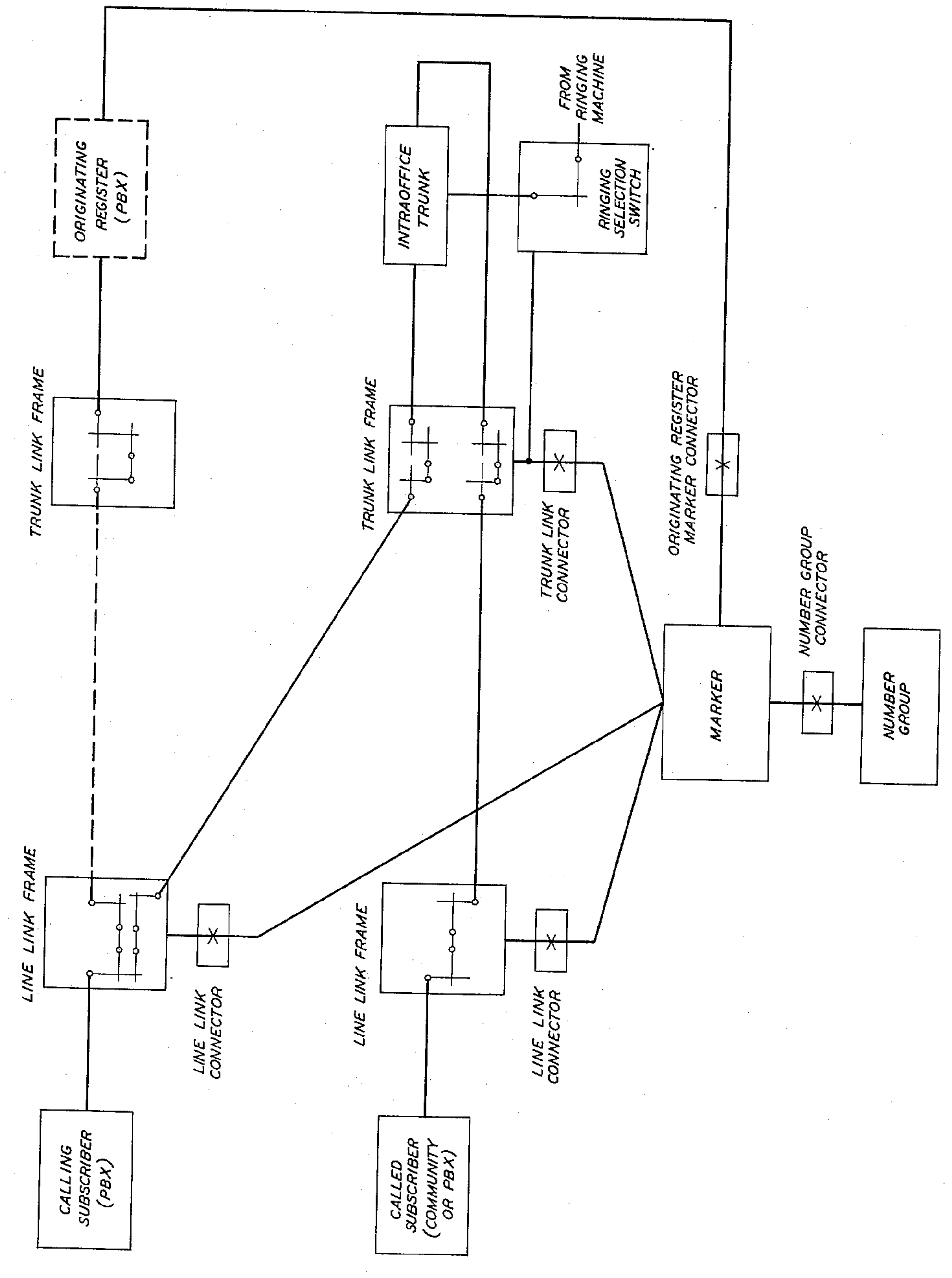

Referring now to FIG. 1B, when the PBX subscriber lifts his receiver from the switchhook, a dialing connection to the PBX originating register is established as described above.

Since the assumed destination of the call is "outside" the PBX, the originating party must dial a predetermined directing code which illustratively may be the digit 9. In consequence of the dialing of the directing code, the PBX originating register adapts its circuitry to recognize that the call is intended for outside the PBX. Subsequent digits following the directing code are stored in the originating register digit storage units. To reach a community subscriber in the combined PBX and central office the calling PBX subscriber may illustratively dial the directing code 9 followed by the seven digits representing the office exchange code and the called directory number.

The equipment in the PBX originating register adapted to recognize and store the directing code includes arrangements (detailed herein) for dynamically ascertaining during the dialing of the first digit whether the first dialed digit is greater or less than the directing code number.

After the dialing of the directing code the PBX customer dials the directory number of the called community subscriber (assuming this is an intraoffice call) and the directory number is stored in the originating register. After the called directory number has been dialed the PBX originating register engages a marker through the originating register marker connector. The register then transmits the line equipment location of the calling line and the digits of the called number to the marker. The marker establishes that the called number is in the same office as the calling line and establishes an intraoffice connection therebetween. A terminating connection is set up between the called line and the intraoffice trunk and an originating connection is set up between the calling line and the intraoffice trunk.

In establishing the terminating connection the marker obtains information from the number group concerning the equipment location of the called number and the type of ringing.

After the marker connects the ringing selection switch it releases itself and the originating register from the intraoffice connection. The subscribers are interconnected and the trunk controls ringing and supervision of the call.

*Intra-PBX Call Between Two PBX Customers*

In this type of call the PBX originating register is connected to the calling PBX subscriber in the manner described above but the PBX customer does not dial the preassigned directing code. Instead the calling customer proceeds directly to dial the digits of the PBX extension which may illustratively include four digits. Since the first dialed digit is not the preassigned directing code the originating register determines that an intra-PBX call is in progress and engages a marker immediately following the dialing of the fourth digit representing the PBX extension number. The PBX originating register than transmits information concerning the calling line and the digits of the called number to the marker. The marker establishes from a PBX signal from the register that the called number is in the same office as the calling subscriber and proceeds to establish an intraoffice trunk connection in a manner similar to that described above.

It will be noted that intraoffice calls between community subscribers, since they do not necessitate the engagement of a special modified or PBX originating register, are treated in a conventional manner similar to that described in the above-referred to patent of A. J. Busch.

*Outgoing (Interoffice) Call By PBX Customer*

Figure 1C:
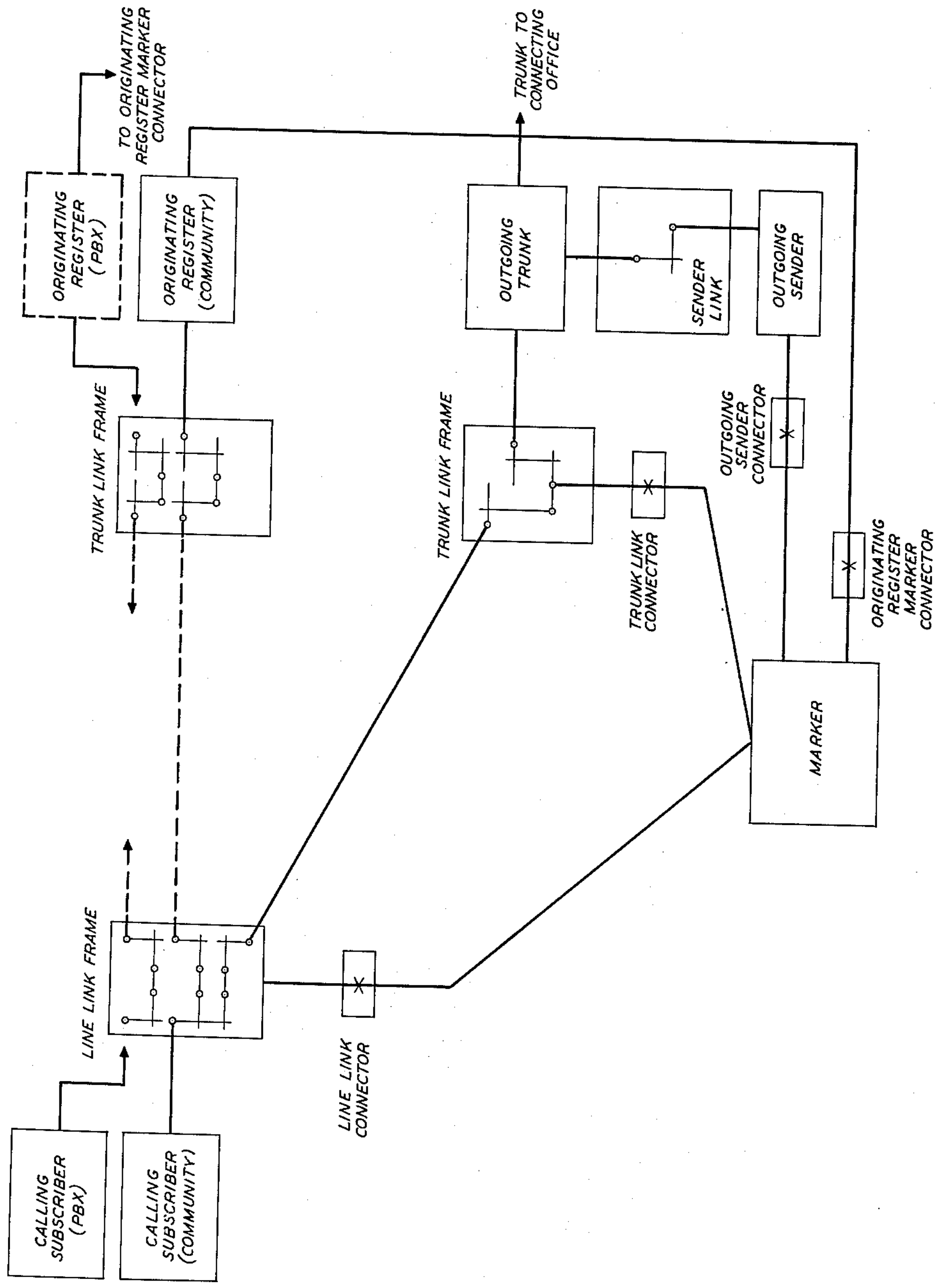

Referring to FIG. 1C, when a PBX subscriber removes the receiver from the switchhook, a dialing connection is established to a modified or PBX originating register in the manner described above. To complete a call to the remote office the originating PBX caller dials the directing code 9. The originating register recognizes that this is a call having a destination outside the PBX and prepares to receive additional dialed digits beginning with a regional or office code. When the subscriber has dialed the remaining digits of the called number the originating register engages a marker through the originating register marker connector. The register transmits the equipment location and class of service of the calling subscriber, the number of the line link frame used in the dialing connection and the called number to the marker. The marker translates the office code to determine that the call is to be completed to a remote office and requires an outgoing sender. The marker also establishes what type of pulsing to utilize in communicating with the connecting office, i.e., multifrequency, dial, revertive, etc.

Through an outgoing sender connector, the marker gains access to an outgoing sender that sends the type of pulses which the connecting office receives. When the outgoing sender connector is engaged the marker gains access to an idle trunk link frame and an outgoing trunk on the frame. The marker then transfers the called number to the sender and completes a connection between the outgoing trunk and the outgoing sender through the sender link.

When the trunk link frame is seized the marker also connects to the line link frame of the calling subscriber and establishes a channel between the subscriber and the outgoing trunk. The marker releases upon completion of its functions and the sender transmits the called number to the connecting office and disconnects itself and the sender link. The outgoing trunk maintains supervision of the call.

Outgoing calls from community subscribers are handled in a manner similar to that described in the above-referred to patent of A. J. Busch.

*Inter-PBX Calls*

When a PBX subscriber in a central office arranged in conjunction with the present invention seeks to establish a connection to a PBX subscriber in a different PBX which is also arranged in conjunction with the present invention, a dialed connection without operator intervention is sufficient to complete the call. In accordance with the above-described procedures the originating PBX subscriber will be connected to a PBX originating register and will dial the predetermined directing code 9.

The originating register recognizes the call as terminating outside the PBX and adapts its register stages to receive the appropriate number of additional dialed digits accordingly. After dialing the directing code the originating subscriber need dial only the digits representing the office code and extension number of the PBX extension sought to be reached. In all respects this seven-digit number is similar to the conventional three-digit office code and four-digit directory number in routine use.

The marker recognizes from the called office code that the call is intended for a remote office and establishes an outgoing trunk connection in the manner described in the previous section. At the called office the connection is completed directly to the PBX extension in a manner identical to that for completing a call to a community line. Thus automatic in-dialing is in effect made available between community subscribers who seek to reach PBX extensions and PBX customers who wish to effect calls to other PBX subscribers in other PBX's.

On incoming calls to the PBX where difficulty in effecting a connection is encountered, conventional intercept techniques may be employed to route the call to a PBX assistance operator. The PBX operator may illustratively be connected to the combined PBX and central office in a manner similar to the other PBX lines and may be equipped with a switchboard adapted for use in a manner analogous to that of the "zero" operator in the above-referred to patent of A. J. Busch.

In addition, where the PBX extension number is unknown, the calling party may dial a general published number for the PBX and be connected to the PBX operator who will complete the call.

*Directing Code Digit Storage in Originating Register*

It is seen from the description heretofore that a key factor in the successful compatible operation of PBX facilities and private community facilities in a combined PBX and telephone central office is the recognition and differentiation between intra-PBX calls, PBX outgoing calls and other types of calls.

This differentiation is effected through the incorporation of a directing code digit by PBX subscribers when an outgoing call is made and the omission of a directing code by PBX subscribers when an intra-PBX call is undertaken. Thus, in accordance with the necessity for storing and acting on directing code information, modifications have been made in those originating registers in the combined office which are designated to serve only PBX customers.

These registers have modified digit storage facilities which are responsive during the dialing of the first digit by a PBX calling party to ascertain if, in fact, a directing code digit has been dialed. The first digit if smaller than or exceeding the number of the directing code digit should be stored in the first digit register; thus the equipment must be of a dynamic quality in the sense that the first digit register should be enabled if a digit smaller than or greater than the directing code digit is dialed. Since the numerical value of the first digit is not known until the entire digit is dialed and since the originating register cannot ascertain whether a number greater than the directing code will be dialed even if the number of pulses representing the directing code have already been received, dynamic register arrangements adapted to act immediately after the dialing of the number of pulses representing a directing code followed by an interdigital interval have been developed.

In an illustrative situation where the directing code digit is 9, the originating register must be arranged to permit the storage in the first digit storage unit of a number smaller than 9 (but exceeding 1 as explained herein) or a number greater than 9, i.e., 10, or 0. As will be more fully described herein in the detailed description, the originating register which serves PBX subscribers is adapted to inhibit the storage of the digit 9 in the first digit register. This digit is instead stored in a special auxiliary storage unit. If the first digit dialed exceeded 9, or was smaller than 9, the first digit register is permitted to store the digit. When the marker connects to the originating register after dialing has been completed, it establishes with facility that an intra-PBX call is intended if it finds no directing code digit stored and that an outgoing or other special service call is in effect if a digit 9 has been stored. The unique arrangements whereby the originating register has been adapted to perform the function of storing information for both intra-PBX and outgoing calls are made clear in the following detailed description.

*Detailed Description of Apparatus-Counting Circuit*

For a comprehensive description of apparatus suitable in conjunction with the present invention, reference may be made to the above-referred to patent of A. J. Busch. In the drawing and in the following description only those items of equipment which are essential to an understanding of the present invention are included. Omitted material is fully treated in the Busch patent. Reference may also be made to Patent No. 2,722,675 of J. Michal et al. issued November 1, 1955 for additional details covering the counting circuit.

For any digit transmitted or dialed, a train of pulses consisting of one to ten equally spaced momentary line openings is generated by the calling subscriber's dial. The number of line openings corresponds to the number dialed. One for the number 1, two for the number 2, etc. and ten for the number 0. These pulses may be at the nominal rate of 10 or 20 each second. Between these trains of pulses an interdigital interval obtains during which the calling line loop remains closed. The pulsing relay L, the contacts of which are shown in FIG. 2, responds to the dial pulses, and the counting circuit including relays 2P1–2P5 counts the number of pulses in each digit. During the interdigital interval the count is transferred to the proper digit register unit 3A, 3F, 4G, 4L, etc. When this transfer is completed the counting relays 2P– are released and the counting circuit is ready to count the pulses of the next digit. The end of the digit is recognized by means of a slow release register advance relay (not shown), the contacts of which (FIGS. 2 and 3—contacts of relay RA) operate during the first open pulse and release during the interdigital interval. The contacts of this relay control the transfer of the count for each digit to the proper digit register unit.

The counting and registration of a digit takes place as the contacts of relay L (FIG. 2) respond to the subscriber dial and the counting circuit counts the number of pulses. Relay L is operated each time the subscriber loop is closed.

As will be seen in the following explanation, relay RA operates during the first dial open pulse when relay L releases and will remain operated until the interdigital interval when relay L is held operated. The dial pulse counting circuit consists of relays 2P1–2P5 and relay 2P2A. Relays 2P1 and 2P2 function as pulse dividers from relay L. The contacts of relays ON and SR are closed when the circuit is seized. When relay L releases on the first dial open pulse with relay SR operated, relay 2P1 operates over a circuit including ground, contacts of relay L, contacts of relay SR, contacts of relay 2P2, winding of relay 2P1 to negative battery. Relay 2P1 locks operated over contacts 210 of relay 2P1 now operated, contacts of relay 3RA1, contacts of relay ON to ground. When relay L reoperates at the end of the first open pulse, relay 2P2 operates over the contacts of relay L, contacts of relay MST1, contacts of relay 3RA1, contacts of relay 2P1, contacts of relay 2P2, winding of relay 2P2 to negative battery.

Relay 2P2 locks to ground through the normally open contacts of relay 2P2, contacts 210 of relay 2P1, contacts of relay 3RA1 and the contacts of relay ON. On the next release of relay L, relay 2P1 releases in consequence of the interruption of its holding path at the normally closed contacts of relay 2P2. Relay 2P1 in releasing opens at contacts 210 the holding circuit to the ground at the contacts of relay ON for relay 2P2 but relay 2P2 remains operated to ground at the normally closed contacts of relay L over a circuit including ground, normally closed contacts of relay L, contacts of relay SR, contacts of relay 2P2, winding of relay 2P2 to negative battery.

On the next operation of relay L, relay 2P2 releases. This cycle is then repeated with relays 2P1 and 2P2 remaining operated at the end of each odd numbered pulse and remaining normal at the end of each even numbered pulse. Relays 2P3, 2P4 and 2P5 are used in various combinations to count and remember the number of operations of relays 2P1 and 2P2. Relay 2P3 operates when relay 2P1 releases at the start of the second open pulse. Relay 2P4 operates when relay 2P2 operates at the end of the third open pulse and relay 2P5 operates when relay 2P2 releases at the end of the sixth open pulse. The sequence of operation of these relays is given in part in the sequence chart shown in FIG. 6 and in full graphical form on FIG. 5.

The auxiliary counting relay 2P2A is operated at the start of the second open pulse when relay 2P3 operates. The function of relay 2P2A is to recognize when the counting circuit counts a first digit greater than "1" and causes the digit to be transferred to the A digit register 3A. Relay 2P2A at contacts 310 and 311 closes the 0 and 1 output leads of the counting circuit.

*Preliminary Pulses*

To prevent an invalid directory number from being registered when the calling subscriber accidentally generates a single pulse by opening the switchhook contacts before dialing, the circuit is arranged so that a "1" cannot be registered on the A digit register. As hereinbefore stated this is the function of relay 2P2A which keeps the 0 and 1 output leads of the counting relays open at contacts 310 and 311 until it operates as a result of the count of a number greater than "1."

*Operation of PBX Originating Register*

Having examined in some detail the structural composition of the PBX originating register, the operation thereof will be analyzed.

When the switchhook contacts at a PBX extension are closed in conjunction with the lifting of the receiver thereat, a series of functions are performed by the common control equipment as explained above to connect the PBX extension to a PBX originating register. This register is similar in some respects to the conventional register adapted for servicing community lines but has incorporated therein additional special facilities for detecting the dialing of an initial directing code. As descrbed above, the relays 2P– in FIG. 2 continue to count in response to the reception of dial pulses as shown in FIGS. 5 and 6.

It will be noted, however, that a marked departure from conventional registration practice takes place before, during and after the dialing of the ninth dial pulse.

When relay L releases at the beginning of the ninth pulse, relay 2P1 operates. Relays 2P3 and 2P5 have already operated as shown in FIGS. 5 and 6. When relay L operates at the end of the ninth pulse, relay 2P2 operates and relay 2DD9 is operated (see FIG. 6).

Relay 2DD9 operates over a path including negative battery, winding of relay 2DD9, contacts of relay 2MAN, contacts of relay 2DD9, contacts of relay 2DD9A, contacts of relay 4AS, contacts of relay 2P5, contacts of relay 2P3, contacts of relay 2P1, contacts of relay 2P2, contacts of relay 3RA1 and contacts of relay ON to ground. Relay 2P4 is released as a result of the operation of relay 2P2 in consequence of the interruption of the holding circuit therefor at the contacts 211 of relay 2P2.

Relay 2P2A releases in consequence of the operation of relay 2DD9 at the contacts 212 of relay 2DD9 in series therewith. The operation of relay 2DD9 opens the operating path to the digit relays 3A2 and 3A7 as a result of the opening of the contacts of relay 2DD9 in series therewith.

During the interdigital interval which obtains after the transmission of the digit 9, relay RA releases as explained above and relay 3RA1 operates over a path including the contacts of relay RA and the contacts 312 of relay ON. Relays 2P3, 2P1, 2P2 and 2P5 now release as shown in FIG. 6. Relay 2DD9A operates in consequence of the release of relay 2P3 over a circuit including negative battery, winding of relay 2DD9A, contacts of relay 2DD9, contacts of relay 2P3 and the contacts 213 of relay ON to ground.

The 2 and 7 leads to the digit relays 3A2 and 3A7 are reclosed in consequence of the closing of the contacts of relay 2DD9A in series therewith.

If the first digit dialed was a 0 which includes ten dial pulses, relay 2P1 releases and at the end of the tenth pulse, relay L reoperates and relay 2P2 is released. Relay 2MAN is operated when relay L reoperates in view of the previous operation of relays 2P3 and 2P5 and the release of relays 2P4 and 2P1 as shown in the sequence chart of FIG. 6. The operating path for relay 2MAN includes ground, contacts of relay ON, contacts of relay 3RA1, contacts of relay 2P1, contacts of relay 2P3, contacts of relays 2P4, 2P5, 4AS and winding of relay 2MAN to negative battery.

Relays 2DD9 and 2P2A are respectively released and operated in consequence of the operation of relay 2MAN. Relay 2P2A operates over a path including ground, contacts of relay ON, contacts of relay 2MAN, winding of relay 2P2A to negative battery. Relay 2DD9 releases at the contacts of relay 2MAN in series therewith.

At the conclusion of the tenth pulse and after the interdigital interval, relay RA releases as explained above and relays 3RA1, 3A4 and 3A7 operate.

Relay 3A4 operates over a path including negative battery, winding of relay 3A4, contacts of relay 4AS, output lead 4, contacts of relay 3RA1, contacts of relay 2P3, contacts of relay 2P5, contacts of relay 2P4, contacts of relay 2P2, contacts of relay RA, contacts of relay 4MST1, contacts 312 of relay ON to ground.

Relay 3A7 operates over a path from negative battery, winding of relay 3A7, contacts of relay 4AS, output lead 7, contacts of relay 3RA1, contacts of relay 2DD9, contacts of relay 2P3, contacts of relay 2P5, contacts of relay RA, contacts of relay 4MST1, contacts 312 of relay ON to ground.

Thus when a PBX subscriber dials an initial "0," relay 2DD9 operates at the end of the ninth pulse and digit registers 3A2 and 3A7 are momentarily disabled to prevent the "9" from being registered in the A digit register. On the tenth pulse, however, relay 2MAN operates and releases relay 2DD9 at the contacts of relay 2MAN in series therewith to permit storage of the initial "0" in the A digit register.

*Digit Steering*

The digit steering circuit, a portion of which is shown in FIG. 4, connects the output leads 0, 1, 2, 4 and 7 (FIG. 3) of the pulse counter to the digit registers 3A, 3F, etc. as the digits are received. The steering circuit is also used to indicate when dialing is completed. This circuit consists of one relay per digit of which relays 4AS, 4BS, 4CS and 4LS are shown. The A digit steering relay 4AS is operated when off-normal relay ON operates at the start of a call. Relay 4AS operates from ground, contacts of relay ON, contacts of relay 2P2A, winding of relay 4AS to negative battery. Relay 4AS locks operated over the contacts of relay 4AS, contacts of relay 4BS and the contacts of the remaining steering relays to the contacts of relay ON and ground.

The advance of the digit steering relays is under the control of relay 3RA1. When relay 3RA1 operates at the end of the first digit with relay 2P2A operated as explained above, relay 4BS operates over a path including negative battery, winding of relay 4BS, contacts of relay 4BS, contacts of relay 4AS, contacts of relay 3RA1, contacts of relay 2P2A, contacts of relay ON to ground. Relay 4BS locks operated through the contacts of relay 4CS and the remaining steering relays to the contacts of relay ON and ground over the same locking path previously described for relay 4AS. When relay 3RA1 releases at the start of the next digit, relay 4AS releases at the contacts of relay 3RA1.

This action repeats for each digit with the steering relay for the next digit operating when relay 3RA1 operates at the end of a digit and the steering relay for the digit just registered releasing when relay 3RA1 releases at the start of the next digit. The five output leads 0, 1, 2, 4 and 7 of the counter are carried through individual transfer contacts 4AS1, 4AS2, etc. on the steering relays.

The counting and registration of a digit takes place as relay L responds to the subscriber dial and the counting circuit counts the number of pulses. After the last pulse of the digit, relay L remains operated and relay RA releases.

Relay RA closes a ground over the contacts 312 of relay ON and the contacts of relay 4MST1 through two separate contacts of relay RA to the translating contacts of the counting relays. The ground emerges through contacts of relay 3RA1 on two of the output leads 0, 1, 2, 4 and 7 and is connected by the contacts of a steering relay 4AS, 4BS, etc. to a digit register to cause operation of two of the five digit register relays 3A0, 3A1, etc. in register 3A, 3F, etc.

*Directing Code Digit Dialed by PBX Subscriber—Storage of Next Digit in First Digit Register*

In accordance with the foregoing explanation it is seen that when a PBX subscriber dials an initial "9," the originating register is arranged to recognize that the call is intended for a destination "outside" the PBX and to prepare to receive further dialed digits which may illustratively be 7 or 10 in number.

It is desirable that the next succeeding digit dialed by the PBX subscriber, which is in fact the first digit of the called directory number, be stored in the first digit register. To accomplish this procedure of storing the second dialed digit in the first digit register the steering circuit is equipped to prevent an advance when the first dialed digit is a "9." Referring again to FIG. 4 it is seen that under ordinary circumstances when the first dialed digit is received, relay BS operates at the end of the first digit as explained above. In accordance with the present modified arrangement, however, relay BS is not permitted to operate at the end of the first digit since relay 2P2A was released in consequence of the opening of relay 2P2A in view of the operation of relay 2DD9. As seen in FIG. 6, relay 2DD9 operates at the end of the ninth dial pulse. The contacts 212 of relay 2DD9 in series with relay 2P2A occasions the release thereof. Thus when the first digit dialed is a "9," relay 4BS cannot operate in view of the interruption of its operating path at the contacts of relay 2P2A which is now released. Since relay 4BS does not operate and the steering circuit does not advance, the second dialed digit by the PBX subscriber will be stored in the first digit register 3AF as explained above. Subsequent advance of the steering circuit takes place conventionally when relay 2P2A is operated at the end of the second pulse of the next digit dialed.

*Selection of Marker by Originating Register*

Referring again to FIG. 4 it is seen that the contacts of the steering relays are utilized to effect an energizing connection to the marker by operating the marker start relay 4MST. Thus it is seen that if an intra-PBX is in progress and the marker should be summoned at the end of the fourth digit, the operation of relay ES, not shown, after four digits have been dialed, will result in the operation of relay 4MST over a circuit including ground, contacts of relay ES, contacts of relay 2DD9A, winding of relay 4MST to negative battery. From what has been explained it is manifest that relay 2DD9A does not operate unless an initial directing code of "9" has been stored.

In consequence, if a directing code digit 9 has been dialed by a PBX subscriber, the operation of relay 2DD9A prevents energization of relay 4MST at the termination of the fourth dialed digit and instead relay 4MST does not operate until in the case of a seven-digit call a total of eight digits has ben dialed as indicated by the operation of relay HS, not shown. At the conclusion of the seventh directory number digit a circuit for the operation of relay 4MST may be traced from ground, contacts of relay HS, winding of relay 4MST to negative battery.

Thus, the dialing of an initial directing code digit 9 results in the operation of relay 2DD9A. As seen from FIG. 6, relay 2DD9 operates at the end of the ninth dial pulse and relay 2DD9A awaits the expiration of the interdigital interval as signified by the operation of relay 3RA1 and the release of the counting relay 2P3. If another pulse is received before the expiration of the interdigital intreval, relay 2DD9A does not operate and relay 2DD9 eventually releases. If, however, an interdigital interval follows the ninth dial pulse, relay 2DD9A operates to indicate the reception of a first dialed digit or directing code 9.

It is seen that by introducing facilities in the originating register for discriminating between calls intended for completion within the PBX and calls intended for completion outside the PBX, the basic prerequisites for successful compatible operation of a combined PBX and central office are met. In consequence, by terminating PBX lines in the central office in the same manner that community lines are terminated, each PBX extension appears to calls originating from remote central offices (or the same office) as a private line. In the same manner the conventional automatic message accounting equipment and other revenue and toll recording facilities are connectable to the individual PBX extensions in the same manner as private lines. Direct billing of PBX extensions for toll calls is thereby afforded.

By the same token automatic in-dialing to the PBX extension is available from remote telephone offices or remote PBX's by dialing the exchange code of the combined PBX and central office followed by the extension number.

As to the PBX extensions, however, the fact of individual termination for each extension in a manner similar to that of a private line does not in any way impede the usual intra-PBX facilities since the originating register is adapted to complete PBX calls in the usual manner if no directing code has been dialed. Thus where a PBX illustratively includes less than 7000 lines in the case of a four-digit number PBX, the PBX subscriber, by merely dialing a four-digit number, can be connected to any other PBX extension since the marker is called in at the end of the fourth digit (FIG. 4 as explained above).

It is understood that the above embodiments are merely exemplary and that various modifications may be met without departing from the spirit and scope of the invention.

What is claimed is:

1. A telephone automatic switching system including first and second groups of calling substations, first and second register means, means for individually connecting said first and second register means to said first and second groups of stations respectively, said registers being operative responsive to digital signals from said substations to store the digital value thereof, registration inhibiting means in said second register means, means responsive upon the receipt of a number of pulses in a pulse train corresponding to a predetermined digital value for energizing said inhibiting means to prevent storage in said second register of said predetermined digital value, and means responsive upon the receipt of at least one succeeding pulse in said same pulse train corresponding to a digital value higher in numerical order than said predetermined digital value for disabling said inhibiting means to permit storage in said second register of said higher digital value.

2. A telephone automatic switching system in accordance with claim 1 further comprising means in said second register operatively responsive to said energized inhibiting means for determining that the number of further digits to be received will exceed a predetermined number of said digits.

3. A telephone automatic switching system including a first group of private branch exchange lines and a second group of community lines, said lines including signaling means, means for terminating said first group of lines and said second group of lines, first and second register means accessible and individually connectable to said first and second groups of lines respectively, said registers being operative responsive to digital signals from said lines for storing the digital value thereof, means connectable to said register means and responsive to the storage of digital signals from a calling line in one of said groups of lines representing a called line in the other of said groups of lines for interconnecting said calling and called lines, registration inhibiting means in said second register means, means in said second register responsive to the reception of a predetermined number of pulses from a calling one of said private branch exchange lines for energizing said inhibiting means to prevent storage in said second register of the digital value signified by said predetermined number of pulses, means in said second register responsive to the reception of said predetermined number of pulses and a succeeding pulse within a particular interval for disabling said inhibiting means to permit storage in said second register of a digital value exceeding that signified by said predetermined number of pulses, and means in said second register responsive to the reception of pulses less than said predetermined number for disabling said inhibiting means to permit storage in said register of a digital value less than that signified by said predetermined number.

4. A telephone automatic switching system in accordance with claim 3 including in addition means in said second register responsive to the reception of signals from a calling one of said lines signifying a digit having a value less than said predetermined number and an additional number of digits representing a private branch exchange line number for storing said number, and means connectable to said second register for interconnecting said calling line and said private branch exchange line represented by said stored number.

5. A telephone automatic switching system in accordance with claim 3 including additional means in said second register responsive to the reception of signals from a calling one of said lines signifying said predetermined number and an additional number of digits representing a community line number for storing said line number, and means connectable to said second register for interconnecting said calling line and said community line represented by said stored number.

6. A telephone central office including first and second groups of stations having signaling means, a plurality of line link frames, means for similarly terminating said first and second groups of stations on said line link frames, first and second register means accessible to said line link frames and individually connectable to said first and second groups of stations respectively, said registers being operative responsive to digital signals from said stations to store the digital value thereof, means in said first register responsive to said signaling means for storage of a first number of digits from a calling one of said first group of stations representing a particular one of said second group of stations, means connectable to said first register means and responsive to the storage therein of said first number of digits for interconnecting said calling station and said station representted by said first number of digits, means in said second register responsive to said signaling means at a calling one of said second stations for storing a second number of digits representing said particular one station, said second number of digits being smaller than said first number of digits, and means connectable to said second register and responsive to the staroge therein of said second number of digits for interconnecting said calling one of said second group of stations to said called station.

7. An automatic telephone central office including a first and second group of substations including dialing means, a plurality of line link frames, means for similarly connecting said first and second groups of calling substations to said line link frames, first and second registers accessible to said line link frames and individually connectable to said first and second groups of substations respectively, means in said first registers responsive to the dialing by a calling substation in said first group of a first number representing a substation in said second group for storing said first number, means connectable to said first registers and responsive to the storage of said first number for interconnecting said calling substation in said first group and said substation in said second group represented by said first number, means in said second register responsive to the dialing by a calling substation in said second group of a different number representing the same substation in said second group identified by said first number for storing said different number, and means connectable to said second register and responsive to the storage of said different number for interconnecting said calling substation in said second group and said substation represented by said second number.

8. A telephone automatic central office including a first and second group of substations having dialing means, said first group of substations having a relatively lower community of interest than said second group of substations, means for interconnecting said substations in said second group in response to the dialing of a first number of digits from said substations, means for interconnecting said substations in said first group in response to the dialing from said substations of a second number of digits, and means for connecting said substations in said first group to said substations in said second group in response to the dialing of a third number of digits by said substations in said second group.

9. A telephone automatic switching system in accordance with claim 8 including in addition means for connecting said substations in said first group to said substations in said second group in response to the dialing of said second number of digits by said substations in said first group.

10. A combined telephone central office and private branch exchange including a plurality of community lines and a plurality of private branch exchange lines including dialing means, a plurality of line link frames, means for terminating said community lines and said private branch exchange lines on said line link frames, first and second groups of registers accessible to said line link frames and individually connectable to said community lines and private branch exchange lines respectively, means including said first registers responsive to the dialing of an exchange code and directory number by said community lines for interconnecting said community lines, means including said first registers responsive to the dialing of an exchange code and directory number by said community lines for connecting said community lines to said private branch exchange lines, means including said second registers responsive to the dialing of a directing code followed by an exchange code and directory number by said private branch exchange lines for connecting said private branch exchange lines to said community lines, and means in said second register responsive to the dialing of only a directory number by said private branch exchange lines for interconnecting said private branch exchange lines.

11. A combined telephone office and private branch exchange including a plurality of community lines and a plurality of private branch exchange lines having dialing means, a plurality of line link frames terminating said community lines and private branch exchange lines, first and second groups of registers having digital storage elements and accessible to said line link frames and individually connectable to said community and private branch exchange lines respectively, means including said first registers responsive to the dialing by said community lines of an exchange code followed by a directory number for interconnecting said community lines and for connecting said community lines to said private branch exchange lines, means including said second registers responsive to the dialing by said private branch exchange lines of a directing code followed by an exchange code and directory number for connecting said private branch exchange lines to said community lines, registration inhibiting means in said second register responsive to the reception of said directing code for energizing said inhibiting means to prevent storage of said directing code in said digital storage elements of said second register, and means in said second register responsive to the reception of said directing code and a succeeding signal within a predetermined interval for disabling said inhibiting means to permit storage in said register of a digital value greater than the directing code.

12. A combined telephone office and private branch exchange in accordance with claim 11 comprising in addition means including said second registers responsive to the dialing by said private branch exchange lines of only a directory number for interconnecting said private branch exchange lines.

13. A combined telephone office and private branch exchange including a plurality of community lines and a plurality of private branch exchange lines having dialing means, a plurality of line link frames terminating said community lines and private branch exchange lines, first and second groups of registers having digital storage elements and accessible to said line link frames, said groups of registers being individually connectable to said community and private branch exchange lines respectively, means including said first registers responsive to the dialing by said community lines of an exchange code followed by a directory number for interconnecting said community lines and for connecting said community lines to said private branch exchange lines, means including said second registers responsive to the dialing by said private branch exchange lines of a directing code followed by an exchange code and directory number for connecting said private branch exchange lines to said community lines, additional means including said second registers responsive to the dialing by said private branch exchange lines of only a directory number for interconnecting said private branch exchange lines, registration inhibiting means in said second registers responsive to the reception of said directing code for energizing said inhibiting means to prevent storage of said directing code in said digital storage elements of said second registers, said inhibiting means including at least a first and second relay, said first relay being operative responsive to the reception of a predetermined number of pulses signifying said directing code, said second relay being operative responsive to the operation of said first relay and the expiration of a time period representing an interdigital interval, said first relay being conditioned to release in response to the reception of an additional pulse prior to the expiration of said predetermined time interval, means responsive to the operation of said second relay for blocking the storage of said directing code in said digital storage elements, and means responsive to the release of said second relay for permitting the storage in said registers of a digital value exceeding said directing code.

14. A combined telephone office and private branch exchange in accordance with claim 13 including in addition means responsive to the operation of said second relay for steering succeeding dialed signals into an initial one of said digital storage elements.

References Cited in the file of this patent

UNITED STATES PATENTS

| | | |
|---|---|---|
| 1,747,478 | Lomax | Feb. 18, 1930 |
| 2,025,389 | Hovland | Dec. 24, 1935 |
| 2,883,466 | Hutton | Apr. 21, 1959 |